Figure 1:
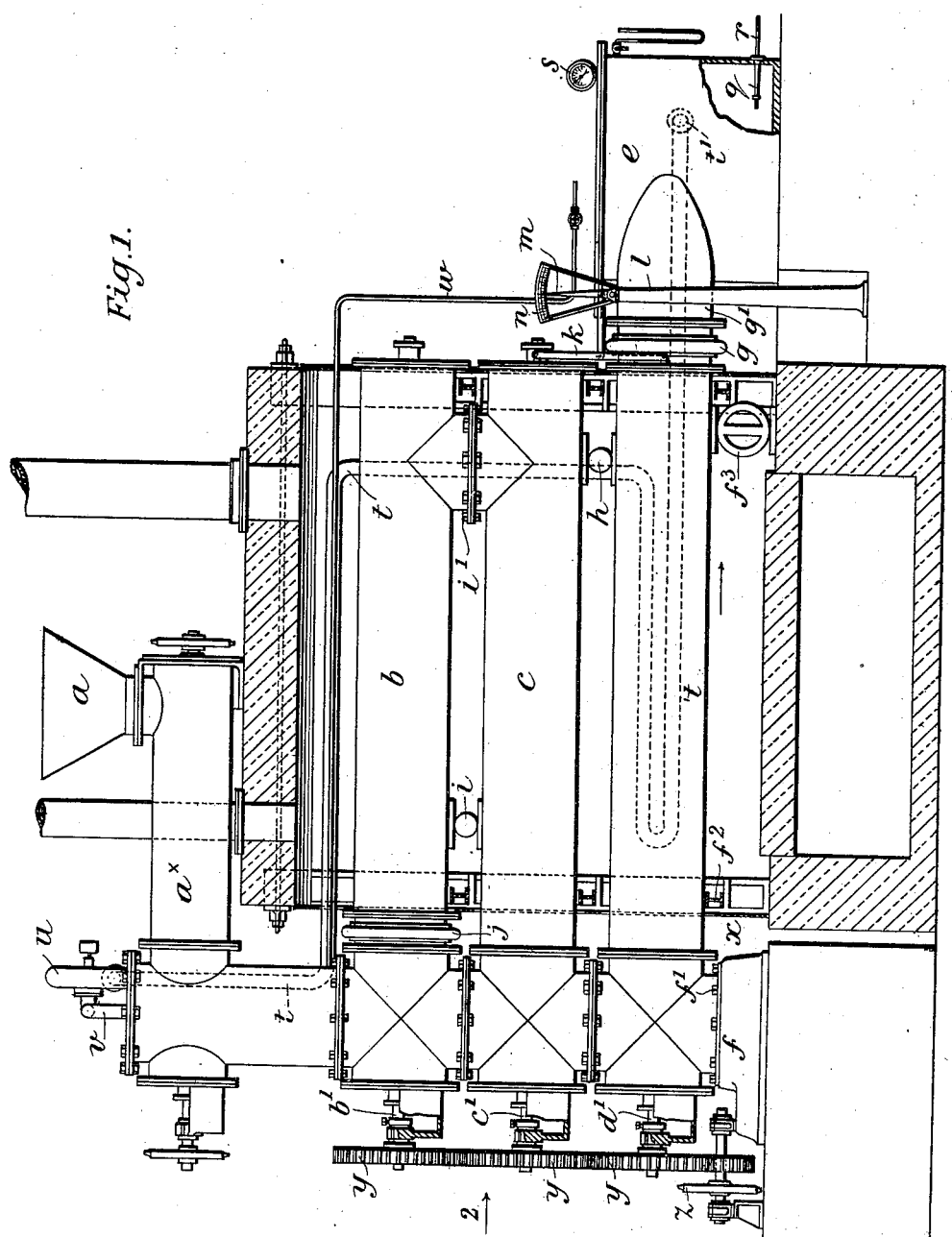

No. 736,083. PATENTED AUG. 11, 1903.
H. C. B. FORESTER.
PROCESS OF MANUFACTURING ARTIFICIAL FUEL.
APPLICATION FILED NOV. 12, 1900.
NO MODEL. 5 SHEETS—SHEET 1.

Witnesses.
Inventor:
H. C. B. Forster
by Wilkinson + Fisher,
Attorneys.

No. 736,083. PATENTED AUG. 11, 1903.
H. C. B. FORESTER.
PROCESS OF MANUFACTURING ARTIFICIAL FUEL.
APPLICATION FILED NOV. 12, 1900.
NO MODEL.
5 SHEETS—SHEET 3.

Witnesses:

Inventor:
H. C. B. Forester
by Wilkinson & Fisher
Attorneys.

No. 736,083. PATENTED AUG. 11, 1903.
H. C. B. FORESTER.
PROCESS OF MANUFACTURING ARTIFICIAL FUEL.
APPLICATION FILED NOV. 12, 1900.
NO MODEL. 5 SHEETS—SHEET 4.
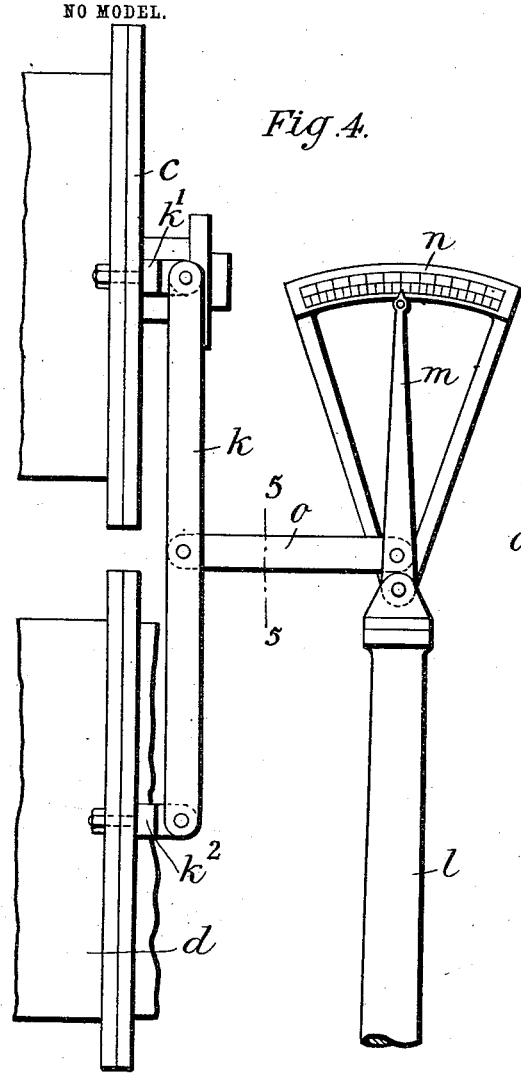
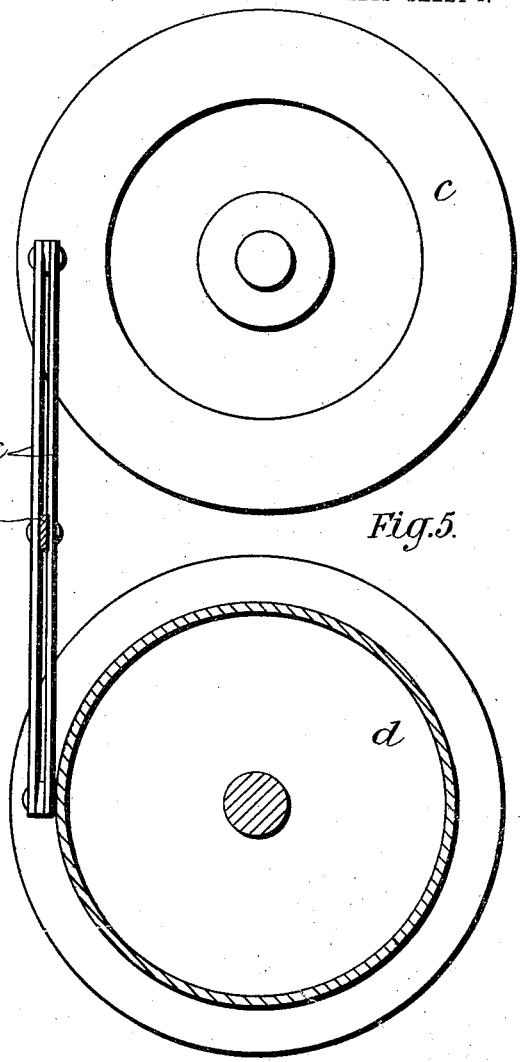
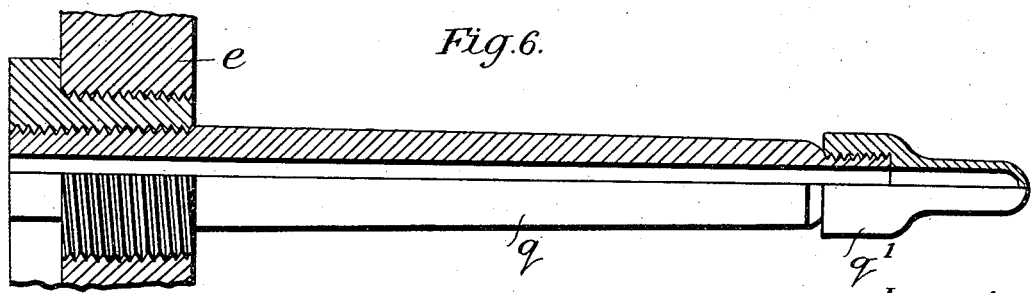

No. 736,083. PATENTED AUG. 11, 1903.
H. C. B. FORESTER.
PROCESS OF MANUFACTURING ARTIFICIAL FUEL.
APPLICATION FILED NOV. 12, 1900.
NO MODEL.
5 SHEETS—SHEET 5.
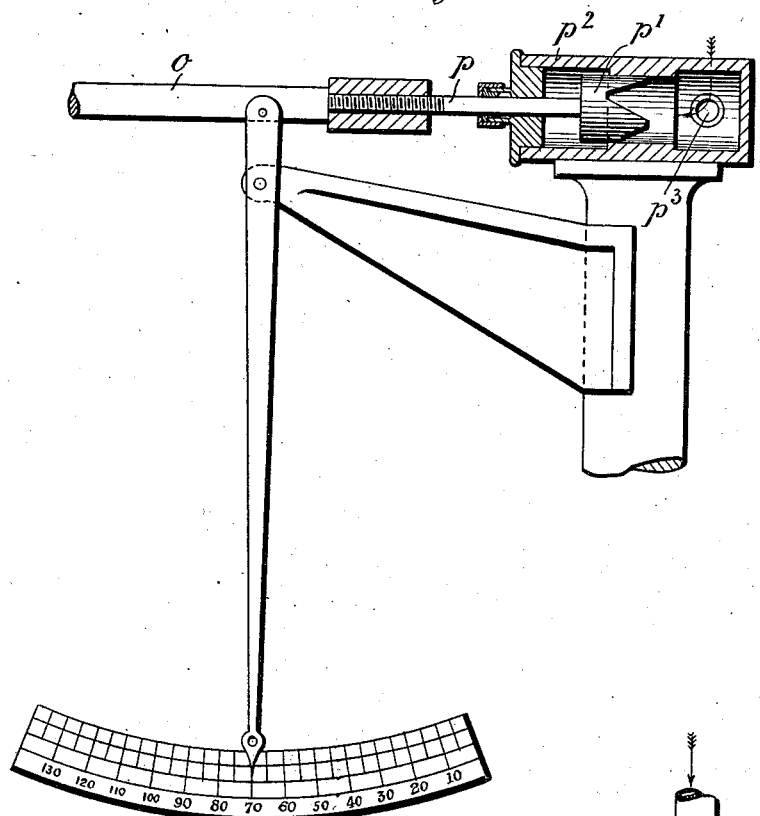
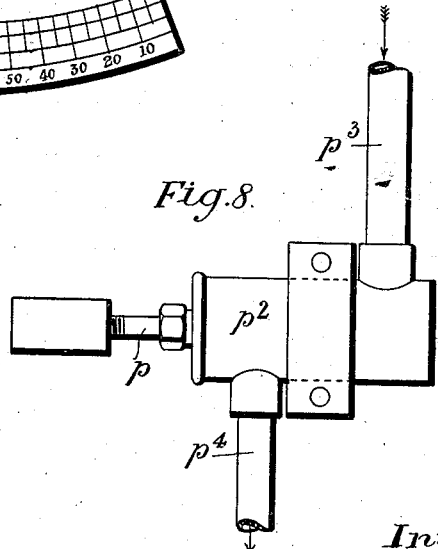
Witnesses:
J. Stephen Kinsta
Percy C. Bowen
Inventor:
H. C. B. Forester
by Wilkinson & Fisher
Attorneys.

No. 736,083. Patented August 11, 1903.

UNITED STATES PATENT OFFICE.

HERBERT C. B. FORESTER, OF SKETTY, ENGLAND.

PROCESS OF MANUFACTURING ARTIFICIAL FUEL.

SPECIFICATION forming part of Letters Patent No. 736,083, dated August 11, 1903.

Application filed November 12, 1900. Serial No. 36,228. (No specimens.)

*To all whom it may concern:*

Be it known that I, HERBERT CHARLES BATH FORESTER, mechanical engineer, a subject of the Queen of Great Britain, residing at Argetty, Sketty, near Swansea, Glamorgan, England, have invented a certain new and useful Process of Manufacturing Artificial Fuel, of which the following is a specification.

My invention relates to an improved process for treating artificial fuel in the course of its manufacture, and is particularly applicable where the fuel material being manufactured is heated while being fed through heated retorts.

The primary object of my invention is to ascertain at any time the temperature of the fuel material and to maintain the temperature at a constant but low degree compatible with the proper agglutination of the material during its passage through the retorts.

Another object of my invention is to ascertain the amount of moisture in the fuel material and to facilitate the heating of said material by introducing additional moisture when the mixture *per se* does not contain a sufficient quantity.

A still further object of my invention is to retain the vapors or gases given off by the heated mass as it is fed through the retorts and to utilize the same by reheating them and circulating these superheated volatile gases through the retorts for facilitating the heating of the fuel material and also absorbing excessive moisture therefrom.

In the manufacture of artificial fuel by the process of heating the same in open vessels or retorts there is experienced a serious loss of volatile matter which it is highly important should be retained in the fuel. Also where the fuel material is heated by means of heat applied externally to the retorts through which said material is caused to pass it has been found that the quality of the fuel produced is unfavorably affected by carbonization if the temperature of the said material is raised excessively, while if the temperature is insufficiently high the agglutination of the fuel material cannot be satisfactorily effected. Hence it is important that the lowest temperature compatible with proper agglutination should be known and strictly adhered to. It has also been found that in cases where the material used contains insufficient water, tar, or other moisture the power of conducting heat in such material is so poor that in order to raise the temperature to the proper degree either the retorts have to be heated to a high degree, with the consequent risk of damage to the retorts and injury to the quality of the fuel produced, or else the heating operation must be prolonged, which would reduce the output. If, however, moisture, whether steam, water, tar, or other fluid or gas or vapor, is added in order to improve the heat-conducting power of the material, great care has to be exercised, as the excessive addition of such moisture will injuriously affect the quality of the fuel.

In carrying out my process the fuel material is advantageously heated partly or entirely by heat applied externally to the retorts, and the temperature to which the material is raised while passing through the retorts is generally about 205° Fahrenheit; but it is obvious that sometimes it may be desirable and necessary to slightly increase or reduce the above degree of temperature, dependent upon whether the melting-point of the agglutinants is higher or lower; but it rarely falls below 195° Fahrenheit or above 215° Fahrenheit. Still I desire it understood that I do not necessarily limit myself within this range of temperature, as the temperature of the material may be raised or lowered even beyond these limits if it be found necessary or desirable. At whatever degree of heat it may be found necessary to treat the fuel material such temperature is retained constant in any suitable manner, but preferably by means of the action of a pyrometer operating upon an automatic regulator for the steam-blast applied to the furnace, and the temperature of the fuel material may at any time be observed by reference to a thermometer, which is inserted in the fuel material preferably at the delivery end of the apparatus, or the temperature may be computed from the action of the pyrometer aforesaid. The vapors or gases given off by the fuel material may be withdrawn, preferably at a point near the feeding end of the apparatus, when they are superheated in any suitable way and delivered back again to the retorts at a point near the discharging end of the apparatus, and during the passage of the fuel material through the retorts these superheated gases are circulated in the opposite direction through the retorts, so that the said vapors having been raised to a very high degree of heat may absorb excessive moisture from the fuel material as it is about to enter the press, which is ordinarily provided for molding the fuel into commercial briquettes, and also assist in heating the advancing mass while the same is passing through the retorts toward the feeding end of the apparatus, and, further, by depositing moisture on the cooler portion of the mixture improve the heat-conducting power of the same, as aforesaid.

Figure 2:
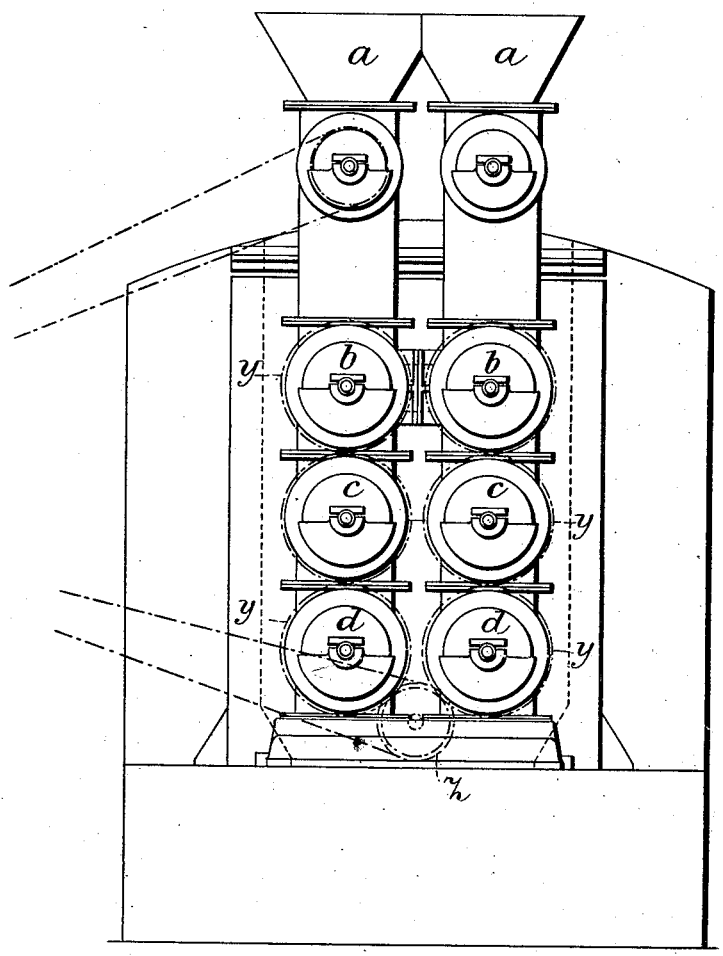
Figure 3:
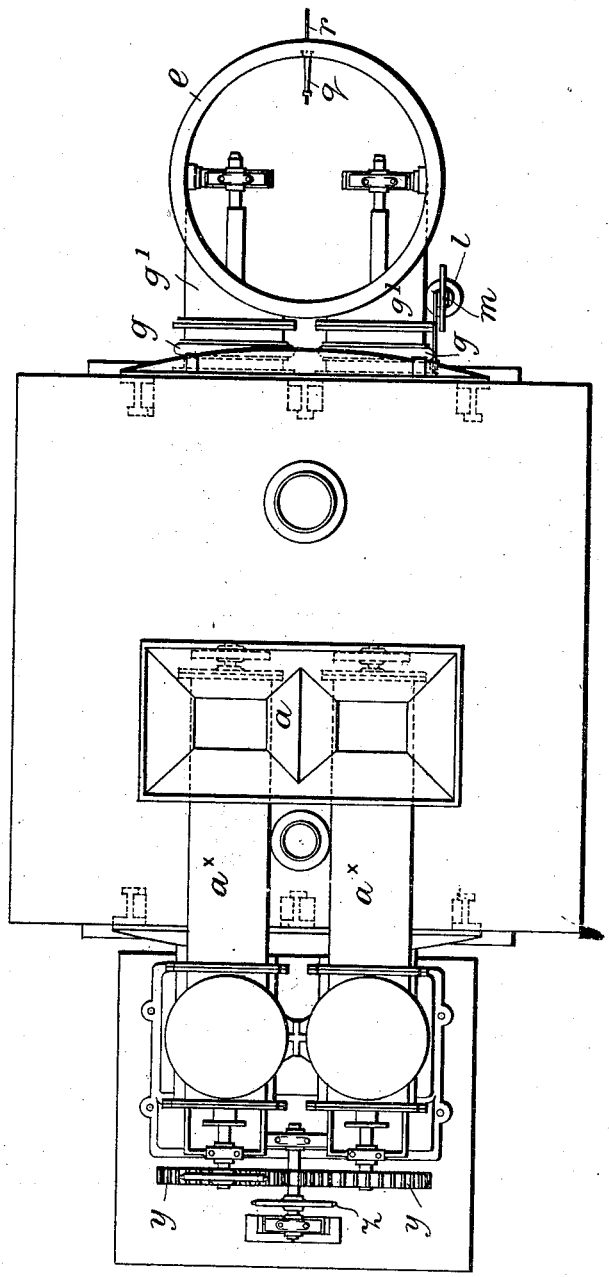

In the accompanying drawings, which illustrate an apparatus adapted to carry out my process, Figure 1 is a side elevation, the side wall of the furnace being removed. Fig. 2 is an end elevation of a double apparatus looking in the direction of the arrow 2 in Fig. 1. Fig. 3 is a plan view of Fig. 2. Fig. 4 is an enlarged detail view showing the pyrometer connected to the retorts. Fig. 5 is an end elevation on the line 5 5, Fig. 4. Fig. 6 shows the thermometer-case fitted to the receiving-pan for the heated fuel. Fig. 7 shows a detail view of an automatic steam-regulator for controlling the heating of the retorts, and Fig. 8 is a plan view of same.

$a$ is the hopper, and below it is situated the feeding-chamber $a^\times$.

$b$, $c$, and $d$ are retorts and have the rotatable shafts $b'$, $c'$, and $d'$ running longitudinally therethrough. These shafts are driven in any suitable manner, such as by the train of gearing $y$ and sprocket $z$, and have conveyer-blades attached thereto for mixing up the material and feeding the same through the retorts, or an Archimedean-screw arrangement might be used, if so desired. The chamber $a^\times$ is also provided with any suitable feeding means operated by a suitable sprocket-wheel. I have not illustrated this feeding mechanism, as it forms no part of the present invention, as any suitable conveying means might be used. These retorts pass through the furnace-wall $x$ and at one end are suitably secured to each other and to the base-plate $f$ and vertical elbow of the chamber $a^\times$ by the bolts $f'$. The upper retort $b$ is also bolted to the retort $c$ at its opposite end, as shown at $i'$; but at this end of the apparatus the retorts $d$ and $c$ are mounted on the rollers $f^3$ and $h$, which provides for differences in expansion between the two retorts and readily permits of their longitudinal movement upon contraction or expansion under the varying heat of the furnace. Auxiliary stationary supports $f^2$ are also provided on the furnace-wall $x$ adjacent the retorts.

The retort $d$ at its delivery end is provided with an expansion-joint $g$, by means of which it is connected to the neck $g'$, leading into a distributing-pan or receiving-receptacle $e$, from which latter the heated fuel material is fed into a suitable shaping-press, (not shown,) or the pan may be dispensed with and the material fed directly into the press. The retort $b$ is similarly provided at its receiving end with the expansion-joint $j$ and is supported by the roller $i$, which permits of the longitudinal movement of the retort $b$, either by its own expansion or contraction or that of the other two retorts on which it is supported.

At the discharging end of the apparatus is suitably mounted a pyrometer which consists of the yoke or rod $k$, Fig. 4, pivotally connected to the studs $k'$ $k^2$, fixed to the retorts $c$ and $d$. To the yoke $k$ is pivoted at one end the link $o$, the other end of which is pivoted to the index-pointer $m$, pivotally supported on the post $l$ and adapted to be moved over a suitable scale $n$ upon expansion or contraction of the retorts $c$ $d$, thus indicating increase or decrease of temperature of said retorts. This pyrometric action is further utilized to automatically regulate the steam-blast to the furnace by extending the rod $o$ and connecting it with the spindle $p$ of the valve $p'$, working in the valve-casing $p^2$, as shown in Fig. 7. $p^3$ represents the inlet-pipe for this automatic regulator, and $p^4$ is the outlet-pipe, which is adapted to conduct the steam-blast to the furnace.

The receiving-pan $e$ is provided with a suitable thermometer $r$. In Figs. 1 and 6 I have illustrated a casing $q$, screwed into the side of the pan $e$, closed at its inner end by the cap $q'$, and provided with a longitudinal bore for receiving the thermometer $r$.

$s$ is a pressure-gage of any suitable type, shown connected to the pan $e$ for indicating the pressure of the gases given off during the process of heating, and thereby practically indicating the extent of the moisture in the fuel mixture, or the degree of moisture might be ascertained by comparing the temperature of the fuel material as shown by the aforementioned thermometer with the temperature of the retorts, as the lesser the moisture in the fuel material the more highly heated will be the retorts to maintain the fuel mixture at a predetermined temperature.

The connections between the communicating chamber $a^\times$, retorts $b$ $c$ $d$, pan $e$, and press (not shown) being gas-tight, the escape of volatiles is prevented during the mixing and heating of the fuel material, their escape through the hopper being prevented by the column of entering material. These gases are utilized for assisting in heating the fuel material and absorbing the superfluous moisture by circulating them in a superheated state above the fuel mixture in the retorts. The gases are in a more or less cool state at the feed end of the retorts, where they are withdrawn through the short pipe $v$ by the fan $u$, are then conducted through the pipe $t$, suitably disposed in proximity to the furnace, becoming highly heated when they are delivered to the pan $e$ at $t'$, and finally circulate in a superheated state through the retorts $d\ c\ b$, where they are again taken up by the fan $u$ and the cycle repeated.

$w$ is a pipe for admitting steam to the interior of the retorts when desired, for instance, to moisten the fuel material; but it is obvious that any other moistening fluid may be used.

While I have thus described my process and the apparatus I have used in carrying the same out, I wish it to be distinctly understood that many different forms of apparatus might be used, and I do not limit myself to any particular apparatus or to the exact details described.

Having thus described my invention, what I claim, and desire to secure by Letters Patent of the United States, is—

1. In the manufacture of artificial fuel, the process of treating the fuel material by feeding the same through a heating region, adding moisture to the cooler portions of said material and absorbing excessive moisture from the heated material as it is being discharged.

2. In the manufacture of artificial fuel, the process of treating the fuel material by feeding the same through a confined heating region, collecting the gases given off from said heated material, superheating the same, and circulating said superheated gases through said fuel material as it is fed through the heating region.

3. In the manufacture of artificial fuel, the process of treating the fuel material by feeding the same through a confined heating region, collecting the gases given off from said heated material, superheating the same, and circulating said superheated gases through said heated material as it is fed through the heating region for assisting to heat said material, depositing moisture on the cooler portions thereof and absorbing excessive moisture from said material as it is being discharged.

4. In the manufacture of artificial fuel, the process of treating the fuel material by feeding the same through a confined heating region and regulating the temperature of said material, by controlling the heat applied, by the expansion and contraction of the confining-walls of said heating region.

5. In the manufacture of artificial fuel, the process of treating the fuel by feeding the same through confined heating regions, ascertaining the temperature of said fuel material in said heating regions and maintaining said temperature by automatically controlling the heat applied by the expansion and contraction of the confining-walls of said heating region.

6. The herein-described process of manufacturing artificial fuel; which consists in introducing the fuel mixture into a confined heating region, raising the temperature of said material as it passes through said region to a definite point, ascertaining when the desired temperature of the fuel mixture has been obtained, and then maintaining said temperature in a constant manner by pyrometrically regulating the heat applied by the expansion and contraction of the confining-walls of said heating region.

7. In the manufacture of artificial fuel, the process of treating the fuel material by feeding the same through a heating region, regulating the temperature of said material by automatically controlling the heat applied, adding moisture to the cooler portion of said material and absorbing excessive moisture from the heated material as it is being discharged.

8. In the manufacture of artificial fuel, the process of treating the fuel material by feeding the same through confined heating regions, regulating the temperature of said material by automatically controlling the heat applied, collecting the gases given off by said heated material, superheating the same and circulating said superheated gases through said fuel material as it is fed through the heating regions.

9. In the manufacture of artificial fuel, the process of treating the fuel material by feeding the same through a heating region, regulating the temperature of said material by controlling the heat applied, and bringing the fuel material up to the required degree of moisture by adding moisture thereto.

10. The herein-described process of manufacturing artificial fuel, which consists in introducing the fuel mixture into an externally-heated confined heating region, raising the temperature of said material as it passes through said region to a definite point, ascertaining when the desired temperature of the fuel mixture has been obtained, maintaining said temperature in a constant manner by regulating the heat applied externally to said heating region, and bringing the fuel mixture up to the required degree of moisture by adding moisture thereto.

11. The herein-described process of manufacturing artificial fuel, which consists in introducing the fuel mixture into a closed heating region, raising the temperature of said material as it passes through said heating region to a definite point, ascertaining by thermometric readings when the desired temperature of the fuel mixture has been obtained, maintaining said temperature in a constant manner by pyrometrically regulating the heat applied, and bringing the fuel mixture up to the required degree of moisture by adding moisture thereto as and when shown to be necessary.

In witness whereof I have hereunto set my hand in presence of two witnesses.

H. C. B. FORESTER.

Witnesses:
EGERTON FORESTER,
WILLIAM D. REES.